July 4, 1933.                F. O'BRIEN                1,916,581
                               LATHE
                        Filed June 24, 1929           2 Sheets-Sheet 1

Inventor
Frank O'Brien

By Blackmore, Spencer & Heth
                        Attorneys

Patented July 4, 1933

1,916,581

UNITED STATES PATENT OFFICE

FRANK O'BRIEN, OF FLINT, MICHIGAN, ASSIGNOR TO GENERAL MOTORS CORPORATION, OF DETROIT, MICHIGAN, A CORPORATION OF DELAWARE

LATHE

Application filed June 24, 1929. Serial No. 373,180.

The object of this invention is to provide a lathe which, although it is susceptible to other uses, is particularly adapted for use in turning irregularly shaped bodies, such as the cams on the camshafts of internal combustion engines.

The object of the invention, to state it more specifically, is to provide, in a lathe of the class described, means for maintaining the cutting tool at approximately the proper cutting angle to the work at all times during the turning operation without tilting the tool.

For a better understanding of the nature and the objects of the present invention, reference is made to the following specification, in which is described the preferred embodiment of my invention which is shown in the accompanying drawings.

Figure 1:
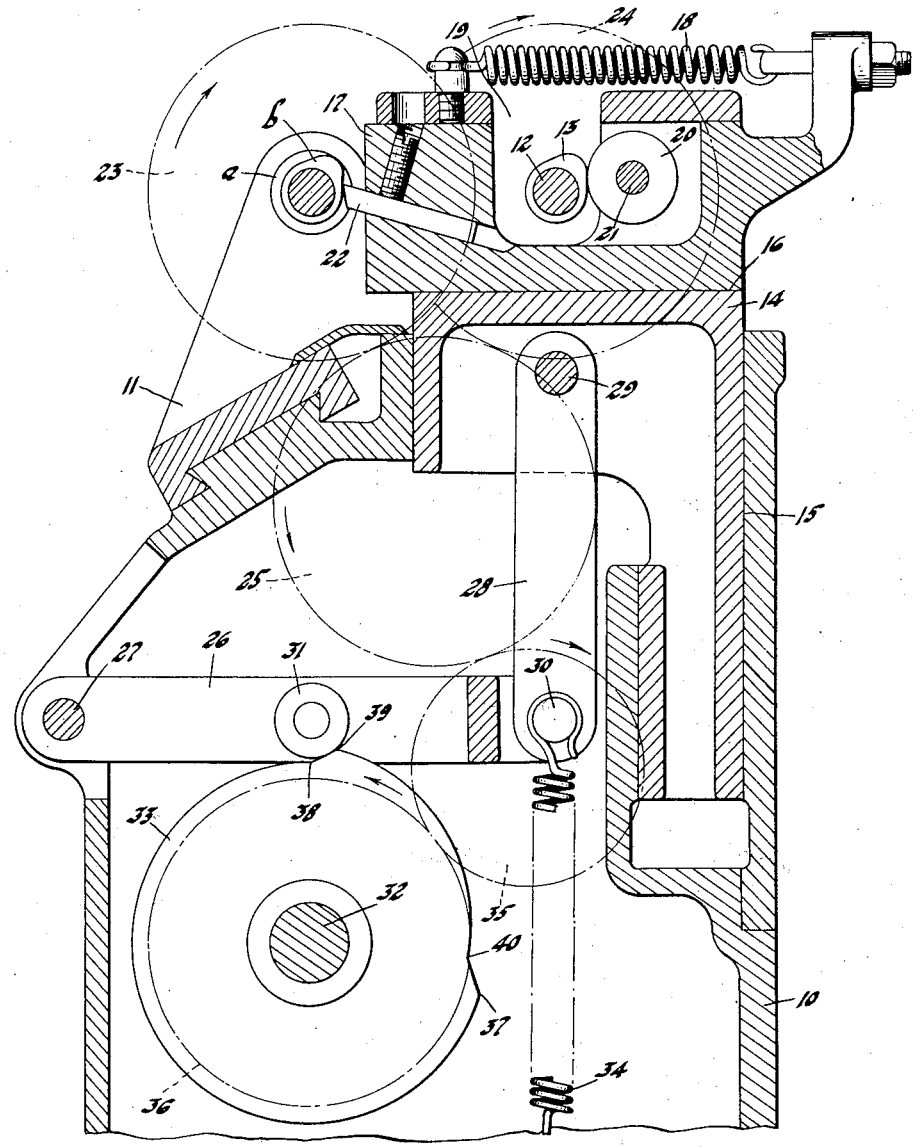
Figure 2:
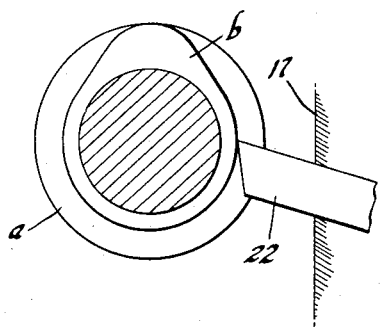

In the accompanying drawings, Fig. 1 is a transverse vertical section through the upper part of a lathe in which is embodied my invention.

Figs. 2, 3, 4, 5 and 6 are enlarged fragmentary views, showing the relative positions of the cutting tool and the work when the work is in different successive angular positions.

In the drawings, the reference character 10 indicates the frame of a lathe. Mounted on the frame 10 and suitably guided for movement longitudinally thereof in a horizontal plane is the work supporting carriage 11. The work supporting carriage carries chucks or other suitable devices (not shown) for holding the work $a$ which, for the purpose of illustration, is shown in the drawings as the camshaft of an internal combustion engine. In chucks or other suitable holding devices (not shown) which are carried by the frame 10, there is mounted a master or pattern camshaft 12 with its axis parallel to and located in the same horizontal plane as the axis of the work $a$. On the master or pattern shaft 12, there are formed a plurality of cams 13 of which each is substantially a replica of one which is to be formed on the work $a$.

The reference character 14 indicates a tool carriage which is mounted for sliding movement in vertical guides 15 in the frame 10.

Although there is shown in the drawings but one tool carriage, it will be understood that a plurality of them, the number depending on the number of cams to be turned on the work, may be provided.

In suitable guides 16, which are provided on the upper end of each of the tool carriages 14, there is mounted, so as to be slidable in a horizontal plane and in a direction at a right angle to the axis of the master or pattern shaft 12, a tool holder 17 which is constantly urged toward the work by a spring 18. Through a recess 19 which extends into the tool holder from the upper side thereof, there extends the master or pattern shaft 12 with one of the master or pattern cams 13 thereon abutting against a roller 20 which is journalled on a shaft 21 carried by the tool holder. From the end of the tool holder adjacent the work $a$, there projects a cutting tool 22 whose cutting edge is located in a line which intersects the axis of the shaft 21 on which the roller 20 is journalled and which is parallel to the plane in which the axes of the work shaft $a$ and the master or pattern shaft 12 are located.

Pinions 23 and 24, respectively, are operatively connected to the work shaft $a$ and to the master or pattern shaft 12. The pinions 23 and 24 are of the same diameter and have the same number of teeth, and both mesh with a third pinion 25 so that when one or the other of the shafts $a$ and 12 rotates the other must rotate at the same speed and in the same direction. During the rotation of the shafts $a$ and 12, the spring 18 and the master or pattern cam 13 on the shaft 12 will cause reciprocation of the tool holder 17 in a horizontal plane so that the tool 22 will turn on the work $a$, a cam $b$ which is substantially a replica of the cam 13 on the master or pattern shaft 12. However, as will be obvious, if the tool moves only in a horizontal plane, the tool will be presented, during the revolution of the master or pattern shaft and the work, at different angles to the work at different points in the revolution, and consequently poor cutting conditions for a portion of each revolution will ensue.

In order that the tool may be presented to the work at approximately the proper cutting angle at all times, there is provided means whereby during a portion of each revolution of the work a vertical movement will be imparted to the tool. This means includes a lever 26 of which one end is pivoted to the frame 10 at 27 and a link 28 of which one end is pivoted to the tool carriage 14 at 29 and of which the opposite end is pivoted to the free end of the lever 26 at 30. Intermediate the ends of the lever 26, there is journalled thereon a roller 31. On the frame 10, below the roller 31, there is journalled a shaft 32 on which is non-rotatably secured a cam 33 whose periphery is maintained in engagement with the periphery of the roller 31 by means of a coil spring 34 whose opposite ends are secured to the free end of the lever 26 and to the frame 10 below the lever. The shaft 32 is adapted to be driven the same speed as, but in the opposite direction to, the shafts $a$ and 12 through a pinion 35 which meshes with the pinion 25 and also meshes with a pinion 36 which is non-rotatably secured to the shaft 32.

Figure 3:
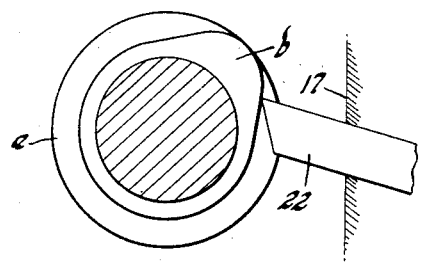
Figure 4:
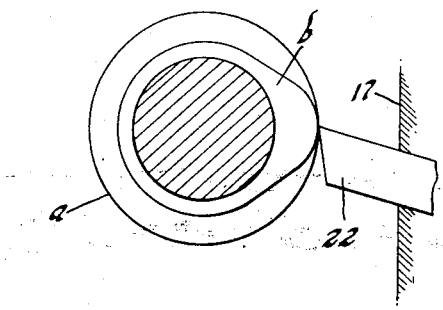
Figure 5:
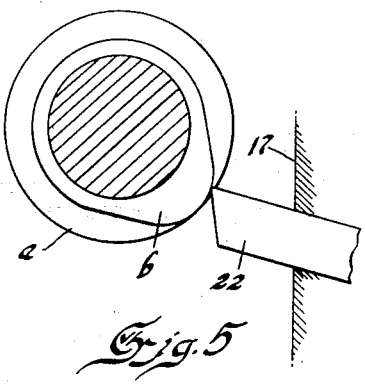
Figure 6:
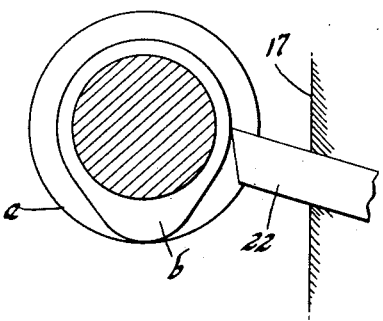

During the operation of the lathe, rotation is imparted to the train of gears, above described, by any suitable means. During the portion of the rotation of the master or pattern shaft 12, during which the base portion of the master or pattern cam 13 is in contact with the periphery of the roller 20, no movement of the tool holder in a horizontal plane will take place, and, since, at this time the portion of the cam 33 between the points 37 and 38, which is formed as a part of the circumference of a circle drawn about the axis of the shaft 32 as a center, is in contact with the roller 31, the tool carriage 14 will not be moved vertically, and the point of contact of the cutting tool with the work will, consequently, remain stationary substantially in the line drawn between the axis of the work $a$ and the axis of the master or pattern shaft. In Figure 6, the tool is shown in the position in which it is located as it is beginning a cut on the base portion of the work cam $b$ and in Figure 2 the tool is shown in the position in which it is located as it approaches the end of a cut on the base portion of the work cam $b$. Upon further rotation of the master or pattern shaft 12 in the direction indicated by the arrow on the drawings, the rise or drop portion of the master or pattern cam 13 will come into contact with the periphery of the roller 20, and the tool holder 17 will, consequently, be moved away from the axis of the work $a$. At the same time that the rise or drop portion of the master cam 13 comes into contact with the roller 20, the roller 31 begins riding up the incline between the points 38 and 39 on the cam 33, and, thus, the tool is raised as it is moved away from the axis of the work $a$. As the parts continue rotating in the directions indicated by the arrows on the drawings, the tool holder 17 will be moved further away from the axis of the work $a$ until the highest point on the cam 13 comes into contact with the roller 20 and the tool carriage will continue to be raised until the point 39 on the cam 33 comes into contact with the roller 31. After the highest point on the cam 13 comes into contact with the roller 20, further rotation of the parts will result in the tool holder moving toward the axis of the work $a$ and after the point 39 on the cam 33 comes into contact with the roller 31 further rotation of the parts will result in the tool carriage moving downwardly. This downward and inward movement of the tool 22 will continue until the point 40 on the cam comes into contact with the roller 33 at which time the tool 22 will be located below the line joining the axes of the shafts $a$ and 12. After the point 40 on the cam 33 comes into contact with the roller 31 and until the point 37 comes into contact therewith the tool will move upwardly and inwardly. When the point 37 on the cam 33 comes into contact with the roller 31, the base portion of the cam 13 again comes into contact with the roller 20 and movement of the tool ceases while the portion of the cam 33 between the points 37 and 38 and the base portion of the cam 13 are in contact with their respective rollers, after which the above-described cycle is repeated. In Figures 3, 4 and 5, the position of the tool with respect to the work $a$ at three successive points during a cut on the rise, drop and dwell portions of the work cam $b$ is shown.

It will be obvious, from the description given above, that by moving the tool in two directions during its travel over the rise, dwell and drop portions of the work cam, the cutting edge of the tool is maintained at approximately the proper angle to the work at all times.

Although I have shown and described a preferred embodiment of my invention, it is to be understood that this has been done merely by way of example and not by way of limitation, and that the scope of my invention is to be limited only by the appended claim.

I claim:

In mechanism of the class described: a frame, a work holder rotatably mounted on the frame; a tool carriage slidably mounted on the frame to one side of the work holder to move in a plane which is transverse to and does not intersect the axis of the work holder; a tool holder slidably mounted on the tool carriage to move in a plane which is transverse to that in which the tool carriage moves and which is transverse to and intersects the axis of the work holder; and means to cause rotary movement of the work holder, to cause reciprocatory sliding movement of the tool carriage on the frame bodily with respect to the work holder, to cause reciprocatory sliding movement of the tool holder on the tool carriage bodily with respect to the work holder, and to synchronize the reciprocatory movements of the tool carriage and the tool holder with the rotary movement of the work holder so as to maintain the tool at all times at approximately the proper cutting angle to work whose periphery is not uniformly spaced from the axis of rotation of the work holder.

In testimony whereof I affix my signature.

FRANK O'BRIEN.